5946X
S. JONES.
Wagon Brake.
Patented May 4. 1830.
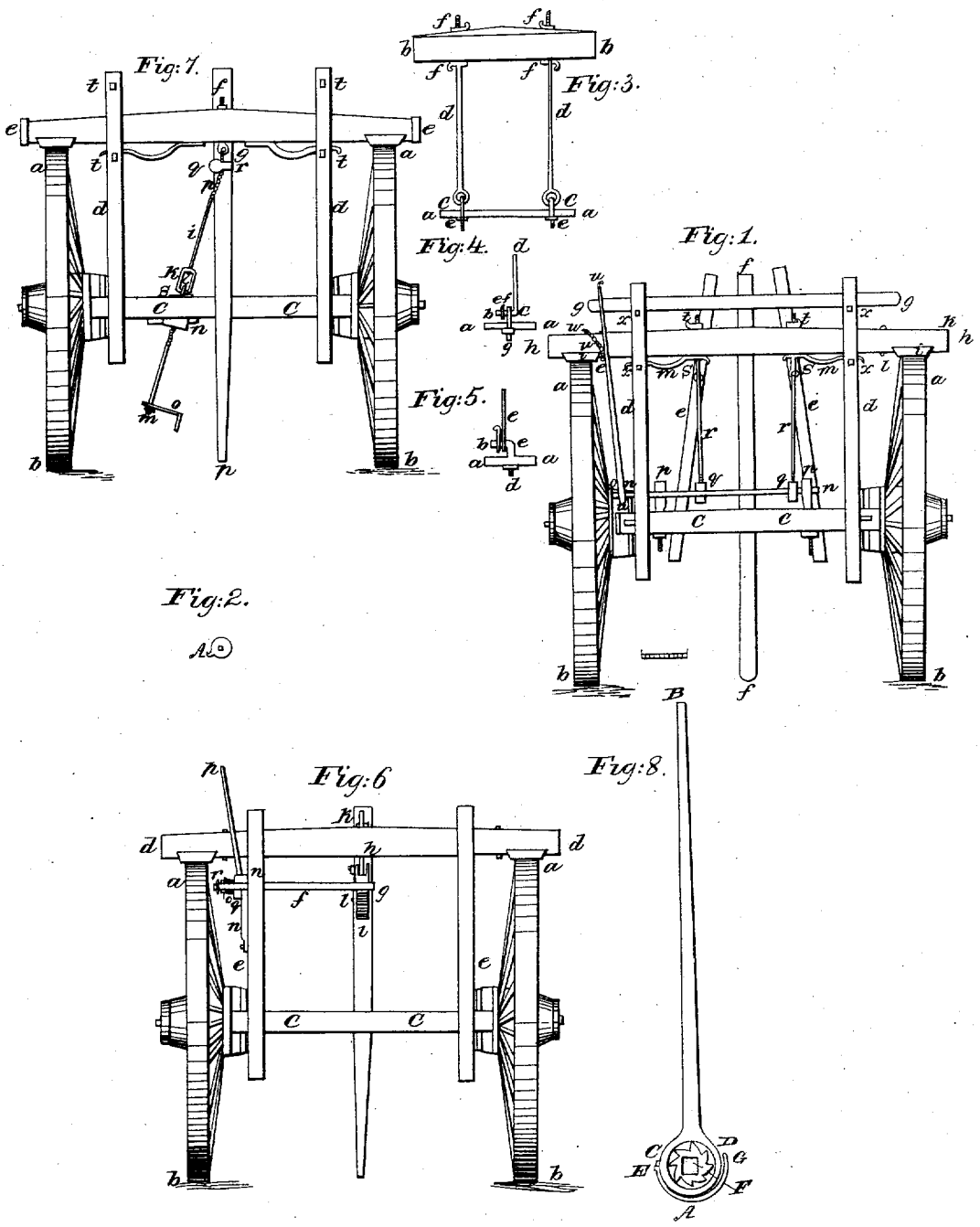
N. PETERS, PHOTO-LITHOGRAPHER, WASHINGTON, D. C.

5/4/1830 5946X 1

Samuel Jones.
Letters Patent Dated May 4th 1830.

---

The schedule referred to in these Letters Patent, and making part of the same, containing a description in the words of the said Samuel Jones himself of his improvements for the purpose of checking or retarding the velocity of road waggons Stages & other wheel carriages & for taking the burden off of the horses in descending a hill & for checking the waggon & taking the weight off of the horses in the ascent of a hill

---

To all to whom these presents shall come:
Be it known that I Samuel Jones of the Borough of Bridgeport in the County of Fayette & State of Pennsylvania have discovered that there was no good method known or practised by waggoners or drivers of checking the velocity of waggons & taking the burden off the horses in descending a hill. The old method of locking the wheels with a lock chain being found to be very imperfect beside the loss of time occasioned by it in stopping to lock & again to unlock the waggon & being particularly destructive to the tire especially on turnpike roads which have of late years been so greatly multiplied in our country beside the incalculable injury thereby caused to the roads & otherwise injurious to the waggon as well as to the horses Although a partial remedy was found a number of years ago by a contrivance by which the hind horses were somewhat relieved from the pressure of the weight by means of a friction bar which was pressed against the [illegible] part of the hind wheels by their application of [illegible] in the act of holding back. Yet this too is found to be Drawing

5/4/1830 5946X considerably defective, & particularly as the hind horses
have still to sustain very heavy burdens & often to go
by jerks in the very unnatural position of holding
back, & from which cause, many very valuable horses
have been ruined. To remedy which I have invented
several new & useful machines or improvements
for the purpose of checking or retarding the velocity
of road waggons stages or other wheel carriages &
for taking the burden off the horses in descending
a hill & for checking the waggon & taking the weight
off of the horses when resting on the ascent of a hill
& that the following is a full & exact description of the
construction & operation of some of the said machines
or improvements as invented or improved by me.
The said machines I call "Foxes Waggon lock"
A friction bar for a large waggon is formed of
White Oak, ash or other suitable wood, about six
inches wide in the middle & 6 inches at each end
by 2 & 1/2 inches thick & long enough to reach from
one of the hind wheels to the other & to project 4
or 5 inches beyond each wheel one of its sides being
straight. Near each end & opposite to each wheel
when in use on the narrowest side of the bar a piece
is cut out a little wedging & dovetailed as follows.
A line 6 inches in length is drawn on the upper
side of the bar, parallel with & one & one half inch
from the edge next the wheel or straight side an-
other line 4 & 3/4 inches long is drawn along said
edge, so that a line drawn from the middle of
one of these lines to the middle of the other would
be at right angles with said edge, another line
similar to the first is drawn on the under side
but one eighth of an inch shorter & 1 & 1/2 inch from the lower edge, & another line corresponding
with the second line is drawn along the edge at the
under side also one eighth of an inch shorter, than the
corresponding one on the upper edge, a line is then
drawn from each end of each line on the same side of
the bar, to the corresponding end of the other line. The piece
thus marked out is to be sawed & cut out to the mark;
this is for a narrow wheeled waggon of two inch tire
for a broader wheeled waggon the notch should be
cut out proportinally wider; in the place where this
piece is cut out a temporary wedging & dovetailing
block is to be fitted which I call the friction block
& which may be 3 or 4 inches in thickness; and should
extend 4 or 5 inches above & below the bar; this tempo-
rary block may be knocked out & easily replaced
when worn out; A notch made wedging & not dove-
tailing & a block made to fit it I believe would
answer the purpose & perhaps equally as well as the
other: another method of applying a temporary block
is to bore 2 holes horizontally & crofswise thro' each end
of the friction bar, one on each side of the wheel, thro'
each of which, an iron clamp, or screw bolt[?] about
3/4 of an inch in diameter & 8 or 9 inches long[?] to
pass from the side next to the wheel, having a screw[?]
cut on this end about 5 or 6 inches & a nut[?] made
to fit it, on the end of each of these next to the wheels should
be formed two strong claws the points of which should
be about an inch & a half apart & so bent as to hold the
block fast when it is placed between two of them, & which
should be far enough apart for the wheel to turn
round between, without touching them; any piece
of wood or other substance suitable for sustaining
the friction of wheels, placed between the clamps &

5/4/1830 5946X against the edge of the bar, or in a notch cut in the bar
for the purpose; so that the clamps will have a suffi-
cient hold, & the ends screwed tight may serve when
drawn with sufficient force against the wheels to
produce the requisite friction. A plate of cast or wrought
iron, may be nailed to a temporary block of wood
or held fast to it by the clamps & applied to the wheels
as above to sustain the friction when it might
be deemed necessary. To prevent the dovetail or
wedge shaped block from splitting the friction
bar the corners between the notch & the end of the
bar should be shaved a little rounding & a band
about one & 3/4 inch wide drove on close to the
notch, & a rivet driven horizontally thro the bar at
the other side of the block & riveted tight.
The friction bar may be varied in size & shape
& made of wood or metal or part of each accor-
ding to circumstances I do not claim the invention
of the friction bar, nor of the staples which sup-
port it, nor the springs attached to it, but suppose
them to be public property as they have been
long in use in the old plan of applying the bar
to the wheels by the hind horses as herein mention-
ed but I do claim as new & as my own invention
or discovery the invention of the dovetail & wedge
shaped notches in the friction bar & of the tempora-
ry blocks of wood &c to be applied to the wheels of
the waggon as above specified as my improvement
on & substitutes for the former plan of mortising
the blocks into the lower side of the bar & fixing plates
of iron on them to keep them from wearing, & which
temporary blocks of wood are found to answer
better than iron; but as in muddy roads the wood wears rather fast the above mentioned tem-
porary blocks might be plated with iron & in such
case used to advantage. The friction bar when in
use on a road waggon or any other waggon or car-
riage to which it may be applicable, may be con-
fined to & across the bottom of the bed, by two staples
of sufficient strength & large enough to admit the
bar to play back & forward in them about 6 inches
At the place where it comes in contact with the front
of the hind wheels where the staples must be fas-
tened to the larger bed rails for the purpose, by
boring holes & inserting the prongs of the staples thro
them & screwing a bur on each prong or a staple
may be formed with straps ranging along the
under side of the lower bed rail & fastened to it by two
screw bolts with heads to each strap, passing thro
the bed rail from above & thro the straps & fastened
by burrs below. To keep the friction bar & blocks off
from the wheels when not in use, in those methods
of application herein described, where no other plan is
described, I make use of two springs made of
steel about 15 inches long & of sufficient strength
to produce the desired effect, & bent so that the
bar may play 3 or 4 inches, one of these springs
must be fastened to the hind part of each end of
the bar so as to extend thro to the outside of the sta-
ple before mentioned. A stubbed nail about
half an inch thick should be driven into the un-
derside of each end of the friction bar when in its
proper place both either inside or outside of
the staples as guides for the bar or otherwise two
artificial wheels may be made of cast or wrought
iron each about 2 & 1/4 inches in diameter (or the diameter might be less if the prongs of the
staples were bent so that their outer extremity should
be perpendicular to the outer extremity of the lower
box rail) & three fourths of an inch thick, with a half
inch hole thro. the centre; 2 holes should be bored
thro. the friction bar, one at each side of the waggon
bed, outside of and as near to the staples as to ad-
mit the wheels to play against them for guides;
2 pins should be made about 4 inches long &
half an inch square in thickness, with a head on
one end, & a slit cut thro. the other end to hold a
key; one of these pins should be inserted thro.
each of the said holes in the bar, from above,
then thro. the wheel which is to be fastened there
by putting the key into the slit made to receive
it. To apply the friction bar to the purpose
within mentioned I have invented a variety of
methods, the following are descriptions of some of
them: No 1 is as follows. A shaft is made of iron
for a common road waggon about one & an 1/2 inch
square which is to be placed as near as practicable
to the coupling pole where it should be a little roun-
ded & must lie parallel with & the centre of it to be
about 3 inches from the front part of the hind
bolster, & to extend from within 4 inches of the near
side of the waggon bed, or that side where
the driver usually walks to about 14 1/2 inches be-
yond the coupling pole where it should be rounded
2 1/2 inches making a shoulder there, on this shaft
at 10 inches each side of the middle of the coupling
pole is fixed a roller 4 inches in diameter & 1/2
inch thick, on the periphery & back part of each
of which is permanently fixed a hook or staple & to these are attached a few links of chain, made
twisting, so as to lie close to the rollers & to wind on
them, when the shaft is turned; To each of these
chains is fixed a rod of round iron, about half an inch
thick with an eye formed on each end, these two parts
together constitute the connecting chain & to this again
is fixed a screw bolt about 10 inches long & half an inch
square, & about 4 inches of it rounded & a screw nut
on it & each of which is to be inserted thro a hole bored
thro the friction bar for the purpose, at right angles with
the shaft & opposite to one of the rollers; & a wing
nut screwed on each of them at the fore side, The
connecting chains & screw bolts, altogether are to
be of such length as to admit of regulating the dis-
tance of the bar & blocks, from the wheels, & the
elevation of the lever by screwing & unscrewing the
nuts. The shaft is to be fixed to the hind bolster at
the place aforesaid; by 2 strong eye bolts with shoul-
ders, in which it is to turn, passing thro the bolster
& confined by burrs screwed on them behind; one
of them at the far end of the shaft where it had
been rounded & the other one which should be
the strongest & the shoulder turned down, close
inside of the stirrup band & the shaft should be
rounded from the end as far as to where it
turns in the eye so that it may turn freely, on the
outer end of the shaft which should again be made
square with a shoulder & as large as it will admit
& pass thro the eye of the screw bolt, is fixed a hand
lever made of iron four feet or more in length, & fas-
tened to its place by a pin or key or a screw & burr
at the end To confine the lever at the proper place, when 5/4/1850 [illegible]

the necessary friction is applied I have invented
a number of ways, some of which I shall here
describe, a cord or strap may be fastened to the end
of the lever & brought forward & wound on a wheel,
with a handle, that may be attached to the forward
part of the waggon & stopped at the place required by
a ray wheel & click, or a chain about 2 1/2 or 3 feet
long may be fastened to the lever about 3 1/2 feet
from the shaft or a foot from the other end; and
a hook drove into the other end of the waist piece,
or to the lower bed rail to hitch it on when the
requisite friction is attained.

When this machine is required to be applied,
if the wheel &c is used the operator takes hold of the
handle & turns it until he has applied the requi-
site power, when the click on the ray wheel secures
it until it is wanted to be withdrawn, he then
raises the click & the springs force the bar off
of the wheels, or if the chain is used to confine the
lever, which mode I prefer, the operator takes hold
of the hand lever & bears it down which rolls the
chain on the rollers & draws the bar against the
wheels, when he has applied the quantum of
power which he judges necessary for the occa-
sion, he confines the lever to its proper place, by
hitching the lever chain to the hook, as aforemen-
tioned, & when the friction is to be withdrawn, he
unhitches the chain & the springs pressing against
the shanks of the staples, will throw the bar & blocks
off of the wheels I believe that a wooden shaft
& roller might be substituted for the iron shaft
roller & lever, by making them as strong as circum-
stances will admit & require, & strengthening with iron bands, rivets & screw bolts, where necessary;
& that wooden springs to the friction bar might be
substituted for steel.—
No 2, is in every respect the same as No 1, except that
it has but one roler. connecting chain, screw bolt &c
as described in N. 1, instead of 2 & which roller &c
should be placed directly over the coupling pole, where
there is room for it, & consequently higher on the bol-
ster, where there is not room, then as close to it as
practicable, & must be applied in the same way,
& the shaft may be shortened, to extend just be-
yond the coupling pole, where the eye for bolt
must be placed for it to turn in. N 3, is the same
machine as N 1, & must be used in the same way;
the only difference, is in the friction bar which is to
be cut off in 2 places in order to accommodate
it to the waggons the point of whose hounds
rest on the coupling pole & therefore cannot con-
veniently be fixed to give room for it to play in
its integral character; In the end of each piece
where it has been cut off & which must be previous-
ly banded with a strong iron band, must be fixed
lengthwise a strong iron pin to project an inch
or two & which must be inserted into a hole bored
into the hounds for that purpose, & over which
hole at each side, should be nailed a plate of iron, with
a corresponding hole, to prevent the wood from wear-
ing, & so placed that when a small block is fitted to
the notch in each section of the bar & both blocks
brought in contact with the wheels, each section
will be in the range with the other, & as near hor-
izontal as circumstances will admit, The connec-
ting chains in this will require to be placed as

5/4/1830 · 5714X near the outer sides of the waggon bed as practicable
N.4. As a substitute for the roller, connecting chain
& screw bolt, described in N.1 & for the purpose of push-
ing back the friction bar & blocks from the wheels
when not in use; instead of using the forementioned
springs on the friction bar, for that purpose, which
are liable to get out of order, as well as to simplify the
machine & save expense, I have invented the fol-
lowing described eyebolt, which I shall call the shaft
eye bolt, & connecting rod or chain; Thro. the shaft, where
the roller in N.1 is to be described to be placed & which
at that place should be made a little the strongest,
a hole must be punched about one inch square,
at the forward side, & tapering to about half an inch,
at the opposite side, the shaft eye bolt should be
made with a shank, just to fit the said hole & pro-
ject thro. the shaft, about 3 fourths of an inch, which
projection should be rounded & a screw cut on
it & a burr fitted to & screwed tight on it; At the for-
ward side of the shaft, the eye bolt should be 2 3/4
inches long 1/2 inch perpendicular width & 3/4
of an inch thick; which consequently forms a shoul-
der & which shoulder should be placed on the up-
per side. The forward corners should be rounded
& a hole full half an inch or more diameter punched
thro. horizontally at such distance as that the centre of
the hole shall be 2 1/2 inches from the centre of the
shaft, thro. this hole or eye must be inserted one end
of a half inch rod of round iron & an eye turned
[illegible] on it, & which with the eye of the shaft eye,
is to form a joint, which should work close but
freely with the sweep of the lever; The other end
of this connecting rod, should extend forward thro the friction bar to within about an inch of the waste piece, or where there is no waste piece, far enough to give room for the friction bar to play 4 or 5 inches off from the wheels, so as to admit a good sized friction block, & a screw cut on that end of the rod, about eleven inches or long enough to give sufficient room to fix the friction bar at the requisite distance & 2 one wing nuts screwed on the rod, one at each side of the bar to confine it at the place required. A joint may be made in the connecting rod, if the construction of the waggon should require it, about a foot from the end of the rod, including the screw, 2 of the above mentioned holes should be made thro each shaft, & the shaft eyebolts fastened in them as aforesaid, when circumstances will admit & there is sufficient room for them to play freely, one of them on the near side, between the stirrup bands & the bounds, inward [illegible] from the eyebolts, in which the shaft turns, & the other at an equal distance from the coupling pole on the other side, otherwise it will answer as a general rule, to place them about 20 inches apart or 10 inches from the middle of the coupling pole. The other ends of the connecting rod must be inserted thro the friction bar as aforesaid at a corresponding distance, each way from the coupling pole with the shaft eye bolts. The screws & nuts on the ends of the connecting rods are intended to regulate the distance of the friction bar from the wheels according to the size of the friction blocks & the requisite elevation of the lever by screwing or unscrewing the nuts. The connecting rod being stiff when the lever is raised it pushes the bar [illegible]

the blocks off of the wheels; where it should be confined
when not in use by hitching the lever chain to a hook
driven into the bed at a convenient place for the purpose.
In every other respect except what is herein mentioned or
described it is similar to No. 1 & must be worked in
the same way. Or a hook about 3/4 of an inch diam-
eter may be welded to the connecting rod & inserted
thro. the shaft eye bolt & fastened thereby a key thro.
the end of the hook. Or a hook bolt may be made the
shank of which shall be one inch square, to the
shaft from whence thro. the shaft it should be exact-
ly similar to that of the shaft eye bolt, just descri-
bed & should be fastened to the shaft in the same
way. The hook which should be 3/4 of an inch di-
ameter & the centre of which should be 2 1/2 inches
from the centre of the shaft; should project from
the other end of the shank at right angles about
3 inches, & should be inserted through the eye of
the connecting rod just mentioned & fastened there
by a key thro. the end of the hook. No. 5. an eye screw
bolt five eighths of an inch thick is made and
passed thro the middle of the friction bar from behind,
with a screw cut 1 inch on the forward end & a burr
made to fit it & screwed on tight & on the eye of which
just behind the bar is attached about 8 or 9 inches of chain
similar to that which is wound on the roller as
described under No. 1, which is again attached to
an eye made on one end of a half inch rod of iron, the
other end of which is extended to near the hind
axle between the coupling pole & the near hind wheel,
where it passes thro. one end of a strong swivel, with
an open space of 4 by 1 & a 1/2 inch & a strong round
head formed on it, but so as to admit it to turn freely in the swivel, the other end of the swivel is to have
a hole thro it three fourths of one inch diameter & to
receive thro it the small end of the following screw
pin, & which is to be fastened there by a key thro the
end of the pin; The screw pin may be made from
one & a half to 2 1/2 feet in length, & one inch in
diameter except about 8 inches of it, which is
to be 3/4ths of an inch diameter & thro the end of
which a place is punched to receive a key, a screw
must be cut, about 1 or 8 inches on the thickest part,
next to the small end and the other end flattened
& shouldered to receive a crank or handle which is
to be fixed on it; An [illegible] roller of cast
iron must be made about 2 1/2 inches diam-
eter, & one & a half inch thick, with a hole thro the
centre, about 3/4 of an inch diameter. A strong cap
of iron must be made to fit on, & accept the coup-
ling pole, & firmly nailed there, having a pin on
the rear end, of a size to fit in the roller, & to
rise perpendicular from the rear end of the
strap; The roller must be fitted on the pin &
confined by key thro the upper end of it & must
be placed as near the friction bar, at its nearest
proximity as will give sufficient room for the
play of the chain on the roller & conduct the draught
in a line at right angles with the friction bar, A strong
plate of iron is to be firmly attached by screws or nails
to that part of the hind axle, or the axle & bolster togeth-
er, or to a block fitted in between them & fastened
there for the purpose, according to the construction of
the waggon, at the place that will give the crank,
when fitted on the end of the shaft or screw pin
above mentioned a sweep of about 7 inches & room for the hand to turn it; without touching the
coupling pole, or any other part of the waggon; Then
this plate must be cut a female screw one inch
in diameter; in a direction toward the far side of
the roller, & where wood intervenes, a hole must be
bored thro it in the same direction & at the forward
side must also be a plate of iron with a hole thro it
3/4 of an inch in diameter in the same direction &
firmly fastend there, as a guide, & support to the screw
pin; To put it together the screw pin is screwed
thro the screw plate, the small end put thro
the other plate & thro one end of the swivel before
mentioned & fastened there with a key; and
when going to use it the operator takes hold of
the crank & turns it so as to withdraw the screw
which draws the friction bar with the blocks
against the wheels & causes the necessary friction,
& to remove them from the wheels the motion is
reversed, when the springs on the bar will push
them off—

No 6. A shaft of iron is formed, one inch square &
about 31 inches long more or less according to the
width of the waggon bed, & placed under & across the
bed at right angles, just behind and at such distance
from the friction bar as will be most convenient,
to connect the machine therewith & give it full scope
for operation & reaches from within about 5 1/2 inches of the
near side of the bed to about 1 inch beyond the
coupling pole, where the end of it is rounded &
placed in a strong eye bolt the shank of which
passes thro the pole & is fastened by a burr screwd
on the end below & also a screw cut on that end
of the shaft & a burr screwed on it to confine it to its place, & near the other end it turns in a staple
fastened to the under part of the lower bed rail,
where it is also a little rounded, near the far end
of the shaft, & just at the middle of the pole, a
pinion is formed on it having 4 teeth which are
to work in a rack of cast or wrought iron about
7 inches long two inches wide & 1 & a 1/2 inch thick
having 5 half inch teeth. This rack is on the coupling
pole, with the teeth upward where it is confined by
the said eye bolt & by a strong iron spike driven into
the pole on the opposite side of the rack from the
eye bolt & by the pinion, & through the forward end
of it lengthwise is a perpendicular clift about 5/8
of an inch wide & 2 inches long, thro which clift
or fork, horizontally & crosswise is a hole 5/8 of an
inch diameter, a round iron bolt is made 5/8 of an
inch thick & about 9 inches long, having an eye 5/8
of an inch diameter formed on one end & about
an inch of a screw cut on the other end. The eye
of this bolt being a little flattened is inserted in
the fork or clift of the rack & a pin with a head
on one end passed thro. the holes in the rack
& the eye of the bolt, & confined there by a key thro.
the pin. The other end of the bolt is passed thro. a hole
bored thro. the middle of the friction bar so as to fit
tight in it & confined by a burr or nut on the end.
A rag wheel 4 inches in diameter & three eighths of
an inch thick is placed on the shaft, close to the
waggon bed, & a click fastened to the bed to stop the
shaft from turning over when required, to this click is
attached, a strap or cord, which is passed thro a staple
fixed to the waggon bed above the rag wheel & brought
forward & passed thro another staple driven into

5/4/1830 5946X the waggon box, or into the bed at a convenient place,
& a handle fixed to it for convenience, on the near
end of the shaft a crank may be fitted & in that case
the shaft should be shortened 2 or 3 inches & the ma-
chine moved further back & the bolt which con-
nects it with the friction box proportionally
lengthened, to give more sweep to the crank, but
as it would not be so convenient in this situation,
between the hind wheel & the waggon bed to turn
a crank fixed to the shaft, which should produce
sufficient power, I have invented a sliding-
hand lever to be placed on the outer end of the shaft
instead of the crank & which is made according to
the following description. A rag cylinder of
cast iron is formed about 4 1/2 inches long & 2 inches
in diameter including the teeth, having an inch
square hole thro, the middle, lengthwise, with 8
teeth or catches on its periphery running in the
same direction from each end to within 1/8
of an inch of the middle, leaving a space round
it there 1/4 of an inch wide. The teeth of each
end standing in a contrary direction to those of
the other & are formed as follows, one side rises from
the periphery of the rag cylinder about 1/4 of an inch
in a direct line from the centre, whence it declines
in a curve to within 1/8 of an inch of the base of
the next & so on all round the space between
the teeth on one end, must correspond with the space
between those of the other end, so that the stop may
slide freely from one end of the rag cylinder to
the other, another piece of cast iron which I
call a lever box, is made of a cylindrical form
2 1/2 inches long, 2 1/4 in diameter & 1/4 of an inch think; which slides freely round on the rag cylinder midway between the two ends of this box is a lon-gitudinal slit or groove thro the box, one inch long & 1/4 of one inch wide, thro which a stop made of steel of a size to play freely in this slit & in a corres-ponding one, made thro, the lever band, is placed & confined to its place, by a spring placed over it & fastened to the band, & box, by a screw or rivet, which pass thro, both. To the band thus encircling the box, to which it is firmly fastened as afore-said, a hand lever, of which it constitutes a part is attached; this hand lever is made of iron, about 3/4 of an inch square next to the band & half an inch at the other end; & the above mentioned band formed on the end of it, & may be of any convenient length from 20 inches to 2 feet is supposed to be sufficient. The rag wheel must be slid on the shaft, to its place, against the lower bed rail, then the hand lever & box being slid on the rag cylin-der, both must be slid on the shaft, next a washer large enough to prevent the box from sliding off, must be slid on the shaft, & then all confined there, by cutting a screw on the end of the shaft, & screwing a burr on it or by a key or pin thro it. To use this machine, the operator takes hold of the handle lever, & placing it over that end of the rag cylinder which is adapted to the purpose, he raises it to a convenient height when the stop slides freely over it; then by reversing the mo-tion the stop catches one of the teeth of the rag cylinder & he bears down the lever which turns the shaft, until it is stopped by the friction bar, the click catching the rag wheel & securing it

5/4/1830 5740X until he raises the lever & renews his purchase, when he bears it down as before, & thus continues until he has applied the requisite force against the wheels. When the friction is to be withdrawn from the wheels, he takes hold of the handle attached to the cord as aforesaid with one hand & pulling it downward at the same time bears on the hand lever with the other until the click is loosened & raised, & lets the shaft turn back again. And to bring down the lever without turning the shaft, he slides it to the other end of the ray cylinder from whence it is brought down again, the stop sliding over the ray cylinder, when raising the lever again the stop catches the teeth, & the shaft is turned in a contrary direction from the first & the bar pushed back & which operation is renewed until both ends of the friction bar, rest against the forward prongs of the staples in which they slide & which are placed at a proper distance for the purpose.

N 7. A block of suitable wood, which I call the wedge block is formed 2 inches thick 12 inches long, 4 inches wide at one end & tapering to a point at the other end this is the dimensions when the space between the friction bar; with blocks five inches thick fitted in the notches & pressed against the wheels of the waggon & the waist piece is 11 inches; when the space is greater the width must be enlarged equally at each end so as preserve the same angle & with the wedge hereafter to be described to fill up the said space, this wedge block must be pinned or spiked fast to the side of the waist piece, next to the friction
bar & the widest end which is to be at right angles
with it to reach about 4 inches beyond the coupling pole,
the point at the near side; where there is no waist
piece, a piece of wood must be firmly attached to
the under side of the waggon bed as a substitute
for it; Another block which I call the wedge is ,
formed of similar wood, & of the same dimensions
as the wedge block first described & must be placed
so that when the two sloping sides come together
the other two sides will be parallel to each other,
consequently the widest end will be at the near
side from whence it must extend, the same ,
thickness & two inches wide against & to the near end
of the friction bar which for this purpose must be
of equal width, from one end to the other, & may be
about 5 inches wide. In other respects it is similar
to that first described, & must be attached to the
waggon bed by staples &c in the same way—
This part I call the wedge stock. To this end must
be firmly riveted a piece of iron, to strike on,
to apply & to withdraw the friction, & which shall
cover the end of the stock & project about 3/4 of an
inch beyond it on the forward side, & connected
with which must be 2 straps extended along
the forward & the back part of the stock, thro each
of which must be punched 2 holes for the rivets.
The wedge must be inserted thro. the staple at
the near side of the waggon, in which the friction
bar slides & pushed forwards to its place as before
described, where the far end must rest on the coup-
ling pole, to which if too low must be nailed a
piece of wood to raise it on a level with the bar,

5/4/1836 5946X the screw and resting in the staple: A stubbed
nail must be drove into the under side of the
wedge stock inside of the staple to keep it from
slipping out. A hammer of cast or wrought
iron, of a suitable weight & form with a han-
dle of convenient length, must be prepared &
may be fixed by a cord or chain to the fric-
tion bar or the waggon bed or waist piece, with
which the operator strikes on the end of the
wedge stock to cause the friction against the
wheels & to withdraw it, he strikes in a contrary
direction against the above mentioned projection

What I claim as new & as my own invention
or discovery in the above described machines
& for which I ask an exclusive privilege, is as
well the improvement of the dovetail & wedge
shaped notches in the friction bar & of the tem-
porary blocks of wood &c. to be applied to the
wheels of road waggons, Stages &c as herein spe-
cified & the machines or methods of applying
the friction bar, with the blocks as herein
described & before claimed to be my invention,
under the heads of No. 1. 2. 3. & 4. all involving the
same principle of the hand lever, No. 5. In-
volving the principle of the screw & crank, No. 6
involving beside the hand lever & the crank,
the pinion & rack, & No. 7. involving the prin-
ciple of the wedge; as the main general princi-
ple which is involved in all of them, of the man-
ual application & maintainance at pleasure,
of a sufficient regular & determinate friction
against the wheels of the waggon carriage
&c thro the means of the mechanical powers

5/4/1830 5946X

21 and which may be performed with ease & expedition without stopping the horses to apply it Witnesses
James Truman
Edw V. Bull Sam Jones (Received & Recorded anew April 12. 1841)

Ed
J & R

Drawing much obliged